(12) United States Patent
Hamada (10) Patent No.: US 7,178,924 B2
(45) Date of Patent: Feb. 20, 2007

(54) PROJECTOR HAVING A LENS CAP AND A STRING HOLDING MEMBER ATTACHED TO THE LENS CAP

(75) Inventor: Shingo Hamada, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 276 days.

(21) Appl. No.: 10/909,732

(22) Filed: Jul. 30, 2004

(65) Prior Publication Data
US 2005/0024605 A1 Feb. 3, 2005

(30) Foreign Application Priority Data
Aug. 1, 2003 (JP) ............................. 2003-270362

(51) Int. Cl.
*G03B 21/14* (2006.01)
(52) U.S. Cl. ...................... 353/119; 353/100
(58) Field of Classification Search ................ 353/100, 353/101, 119, 122; 396/423, 422, 448; 348/373, 348/374, 375, 844
See application file for complete search history.

(56) References Cited

U.S. PATENT DOCUMENTS

| 4,327,960 | A | * | 5/1982 | Gould ......................... 359/511 |
| 4,814,806 | A | * | 3/1989 | Flax ............................ 396/544 |
| 5,495,290 | A | * | 2/1996 | Choi ..................... 348/333.08 |
| 6,827,453 | B2 | * | 12/2004 | D'Alessio et al. ............. 353/85 |
| 2003/0071978 | A1 | * | 4/2003 | Lung et al. .................. 353/100 |

FOREIGN PATENT DOCUMENTS

| JP | 51-39525 | 3/1976 |
| JP | 56-108125 | 8/1981 |
| JP | 4-94271 | 3/1992 |
| JP | 9-230492 | 9/1997 |
| JP | 2002-271717 | 9/2002 |

(Continued)

OTHER PUBLICATIONS

Patent Abstracts of Japan, Publication No. 04-094271 dated Mar. 26, 1992, 1 pg.

(Continued)

*Primary Examiner*—W. B. Perkey
*Assistant Examiner*—Andrew Sever
(74) *Attorney, Agent, or Firm*—Osha Liang LLP (57) ABSTRACT

A lens cap of a projector has a front portion covering a lens and a cylindrical side portion. The front portion has an opening to which a prescribed string holding member is attached. The string holding member is formed to have a pair of engaging portions, a string inserting portion, a cover portion and a guide groove. The pair of engaging portions are engaged with the opening formed in the lens cap. A string is inserted through the string inserting portion, and the string is retained as a knot of the string prevents the string from being pulled out. The cover portion covers the opening with the string holding member engaged in the opening. The guide groove is formed on the back side of the cover portion, and guides the string from the back side to the front side of the front portion of the lens cap. Thus, the lens cap can easily be put on the focus ring without any interference with the front panel.

7 Claims, 6 Drawing Sheets

FOREIGN PATENT DOCUMENTS

JP            3093280        4/2003

OTHER PUBLICATIONS

Patent Abstracts of Japan, Publication No. 09-230492 dated Sep. 5, 1997, 1 pg.

Search Report issued in Japanese Patent Application No. 2003-270362 issued Sep. 12, 2003 (3 pgs.) with English translation (2 pgs.).

Patent Abstracts of Japan, Publication No. 2002-271717 dated Sep. 20, 2002, 1 pg.

Japanese Patent Office Utility Model Laying-Open Gazette No. 56-108125 dated Aug. 22, 1981, 1 pg.

Japanese Patent Office Utility Model Laying-Open Gazette No. 51-039525 dated Mar. 24, 1976, 1 pg.

Japanese Patent Office Registered Utility Model Gazette, Utility Model Registration No. 3093280, published on Apr. 25, 2003, 1 pg.

\* cited by examiner

PROJECTOR HAVING A LENS CAP AND A STRING HOLDING MEMBER ATTACHED TO THE LENS CAP

BACKGROUND OF THE INVENTION

1. Field of the Invention

The present invention relates to a projector and, more specifically, to a projector having a lens cap.

2. Description of the Background Art

Figure 9:
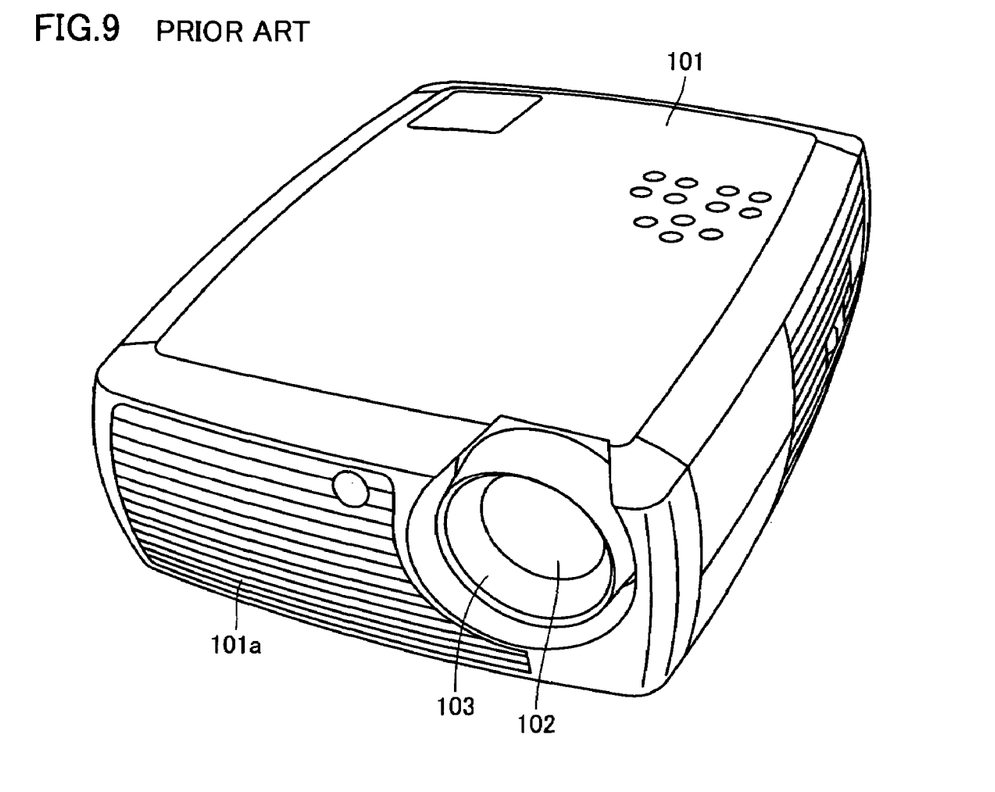
FIG. 9 is a perspective view showing a conventional projector.

A projector is one of devices for displaying images on a screen. As shown in FIG. 9, such a projector 101 has a lens 102 for projecting an image mounted thereon. On lens 102, a focus ring 103 for focusing is mounted. When projector 101 is not in use, a prescribed lens cap is put on focus ring 103, so as to protect lens 102.

Figure 10:
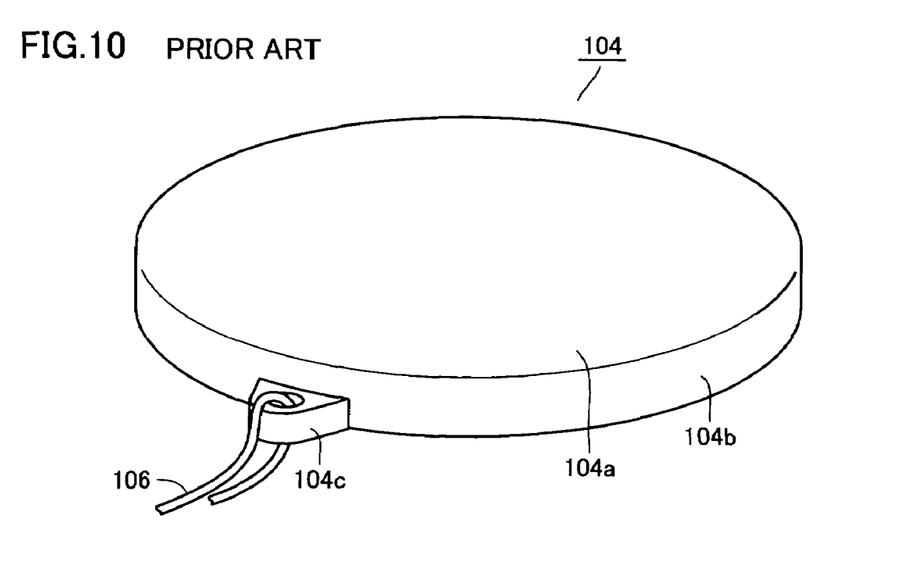
FIG. 10 is a perspective view showing a lens cap used for a conventional projector.

An example of such a lens cap for protecting lens 102 will be described with reference to the lens cap disclosed in Japanese Patent Laying-Open No. 04-094271. Referring to FIG. 10, a lens cap 104 includes a front portion 104a covering lens 102, and a cylindrical side portion 104b formed along the outer circumference of front portion 104a. On side portion 104b, a lock 104c for retaining a string is formed.

Projector 101 has such an arrangement that a string 106 connected to projector 101 is passed through lock 104c, so that lens cap 104 will not be lost.

The conventional projector, however, has the following problem. Referring to FIG. 10, lock 104c of lens cap 104 protrudes outward from side portion 104b.

Figure 11:
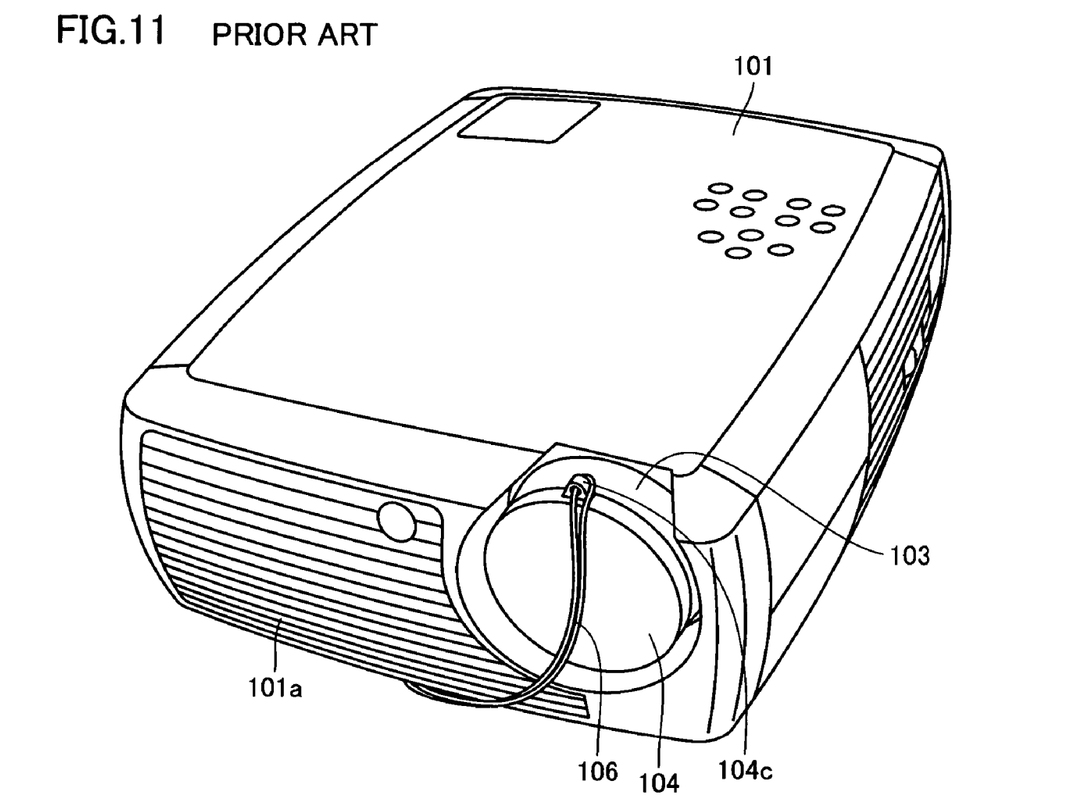
FIG. 11 is a perspective view showing a conventional projector with the lens cap mounted.

Projector 101 sometimes has such a structure that the lens is not protruded from front panel 101a, in view of lens protection and better design, as shown in FIG. 11.

In such a projector 101, a space between focus ring 103 and front panel 101a is relatively narrow, and therefore, when lens cap 104 is put on focus ring 103, lock 104c may interfere with front panel 101a.

In some cases, the position (along the circumferential direction) for attaching lens cap 104 is limited in order to avoid such interference.

SUMMARY OF THE INVENTION

The present invention was made to solve such a problem, and its object is to provide a projector in which a lens cap can be easily put on a focus ring, without any interference with the front panel.

The projector in accordance with the present invention includes a lens portion, a front panel, a focus ring, a lens cap, a prescribed opening, a string holding member and a string. The lens portion is for projecting an image. The front panel is arranged to have a lens opening, through which the lens portion is exposed. The focus ring is mounted on the lens portion, not to protrude from the front panel. The lens cap has a front portion covering the lens portion and a cylindrical side portion formed along the outer circumference of the front portion and covering, along the circumferential direction, the focus ring. The prescribed opening is formed at the front portion of the lens cap. The string holding member is attached to the opening of the lens cap. The string has opposite ends tied to each other to form a knotted ring, and connects the string holding member to the front panel. The string holding member includes a cover portion, a pair of engaging portions, a string inserting portion and a guide groove. The cover portion covers the opening formed in the lens cap. The pair of engaging portions are formed to protrude in one direction from the cover portion, and inserted to the opening to be engaged with the lens cap. The string inserting portion is formed to protrude in one direction from that portion of the cover portion which is sandwiched between the pair of engaging portions, through which the string in a ring shape is inserted extended in one direction, and retains the string, as the string is stopped at the knot. The guide groove is provided on one side of the cover portion, and guides the string from one side to the other side of the front portion of the lens cap, with the string holding member mounted in the opening. The front panel has a retainer ring for retaining the string, at the side opposite to the knotted side.

Because of this arrangement, the string connecting the lens cap and the front panel is retained by the string holding member that is mounted on an opening formed in the front portion of the lens cap. Therefore, as compared with a conventional projector, interference of the string holding member with the front panel can be prevented, even when the focus ring is arranged not to protrude from the front panel. Therefore, positional limitation on mounting the lens cap is eliminated, and the lens cap can easily be put on the focus ring. Even when the front panel or the like is subjected to design change, the lens cap can be put on the focus ring without any design limitation. Further, different from the conventional projector for which the lens cap is molded with the string position determined at a prescribed portion of the lens cap, the present lens cap can be formed simply to have an opening, the string holding portion is molded separately from the lens cap, and the string holding member with the string inserted through the opening may be engaged with the opening. Thus, the cost can be reduced.

According to another aspect of the present invention, the projector has a projector body, a lens portion, a lens cap and a string. The projector body has a front panel. The lens portion is arranged to be exposed at a prescribed position of the front panel. The lens cap protects the lens portion. The string connects the lens cap to the projector body. The lens cap has a front portion and a cylindrical side portion formed along the outer circumference of the front portion. The string is connected to the lens cap at the front portion.

In this arrangement, the string connecting the lens cap and the front panel is connected to the lens cap at the front portion of the lens cap. Therefore, different from the conventional projector, the portion of the lens cap connected to the string does not interfere with the front panel. As a result, positional limitation on mounting the lens cap is eliminated, and the lens cap can easily be put on the lens portion.

Preferably, a string holding member holding one end of the string, mounted on the front portion of the lens cap, is provided for connecting the string to the front portion of the lens cap.

By such a member, the string can easily be connected to the front portion.

Further, for mounting the string holding member on the front portion, an opening is preferably formed on the front portion to be engaged with the string holding member, the string holding member preferably includes a cover portion covering the opening, and the string is preferably held at a portion on the opening side of the cover portion.

More specifically, the string holding member preferably includes: a pair of engaging portions formed to protrude in one direction from the cover portion, and inserted to the opening to be engaged with the lens cap; a string inserting portion formed to protrude in one direction from that portion of the cover portion which is sandwiched between the pair of engaging portions, through which the string is inserted; and a guide groove provided on one side of the cover portion, guiding the string from one side to the other side of the front portion of the lens cap, with the string holding member mounted in the opening.

Here, as the pair of engaging portions are inserted to the opening, the string holding portion is easily engaged with the lens cap. In this state, the string passing through the string inserting portion is guided by the guide groove from one side to the other side of the lens cap.

Further, the string has one and the other end tied to form a ring, the string is passed extended through the inserting portion from the side opposite to the knot, and retained as the string is stopped by the knot at the string inserting portion. Preferably, the projector body includes a retainer ring for retaining that side of the string which is opposite to the knot.

In this manner, by simply knotting the string, the lens cap and the projector can be connected.

Further, even when a focus ring is mounted on the lens portion and the focus ring is arranged not to protrude from the front panel, the portion of the lens cap connected to the string does not interfere with the front panel, and therefore, the lens cap can easily be put on the lens portion.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
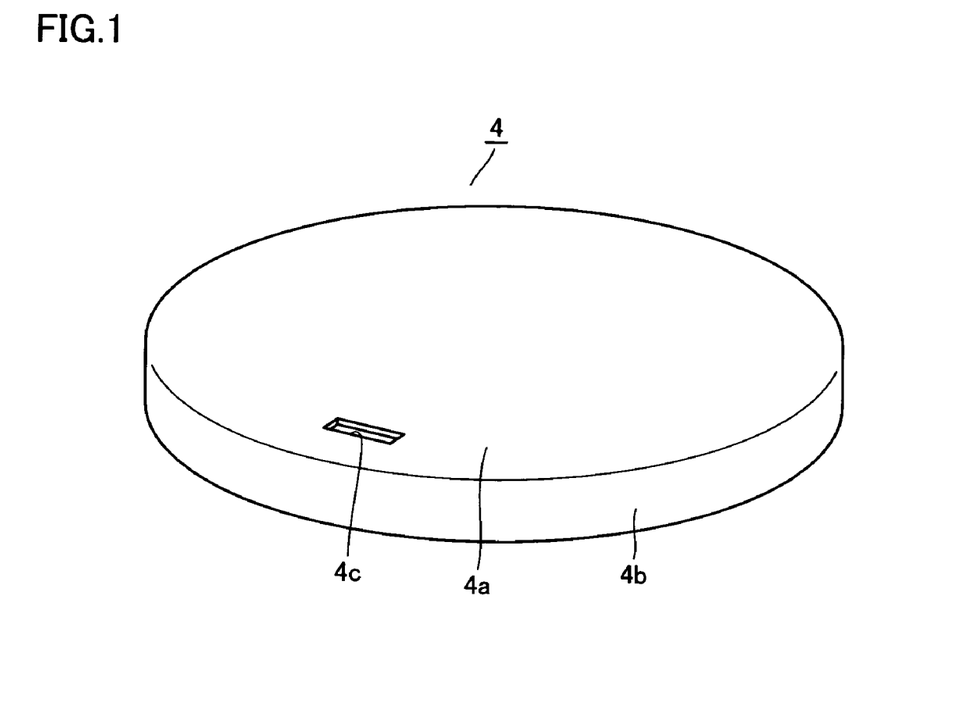
FIG. 1 is a perspective view showing a lens cap used for a projector in accordance with an embodiment of the present invention.

The projector in accordance with an embodiment of the present invention will be described. As shown in FIG. 1, a lens cap 4 put on a focus ring of the projector includes a front portion 4a covering the lens, and a cylindrical side portion 4b formed along the outer circumference of the front portion 4a. The front portion 4a has an opening 4c, to which a prescribed string holding member is mounted, formed therein.

Figure 2:
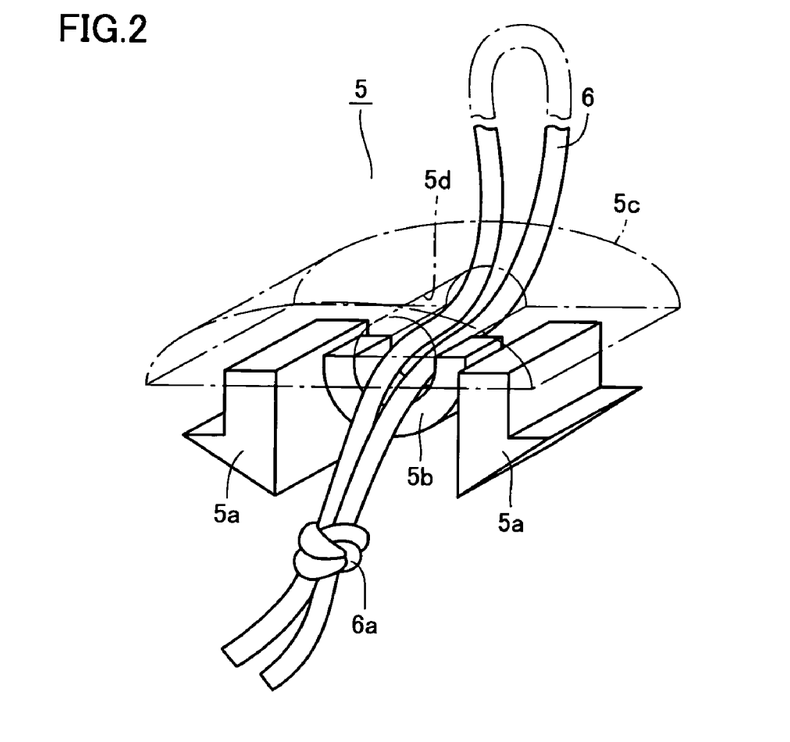
FIG. 2 is a perspective view showing a part of the string and the string holding member of the embodiment.
Figure 3:
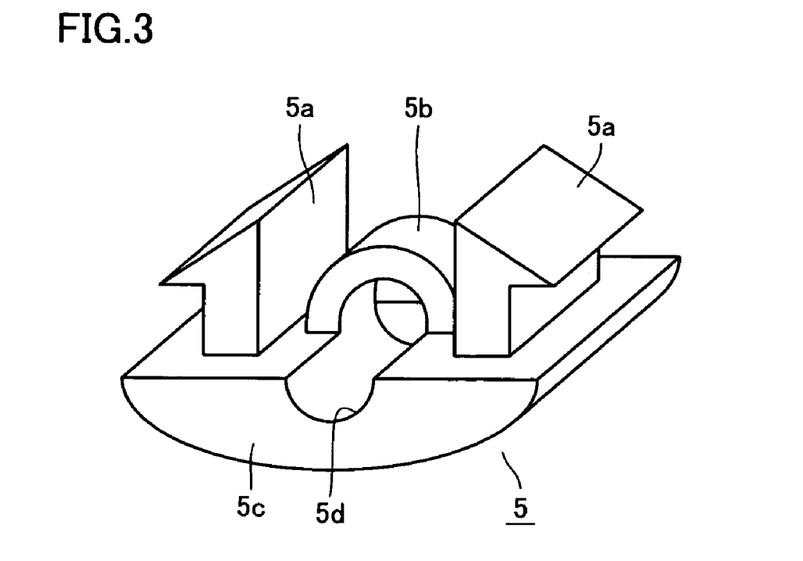
FIG. 3 is another perspective view showing the string holding member in accordance with the embodiment.
Figure 4:
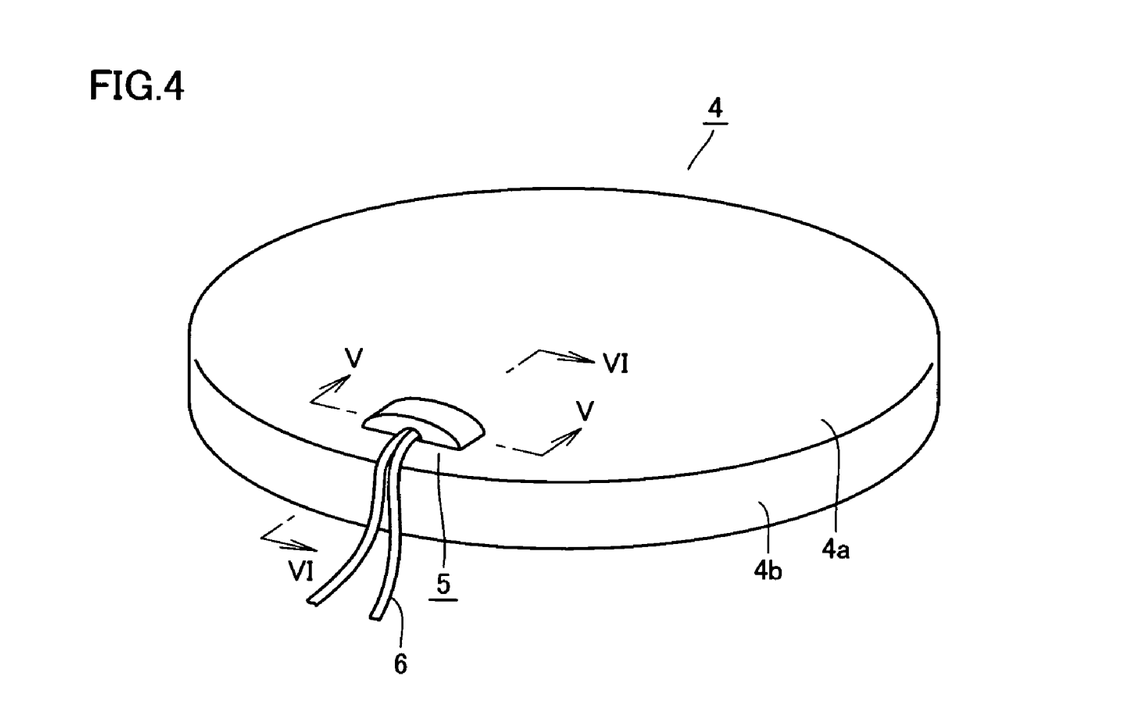
FIG. 4 is a perspective view showing the lens cap to which the lens holding member is mounted, in accordance with the embodiment.
Figure 5:
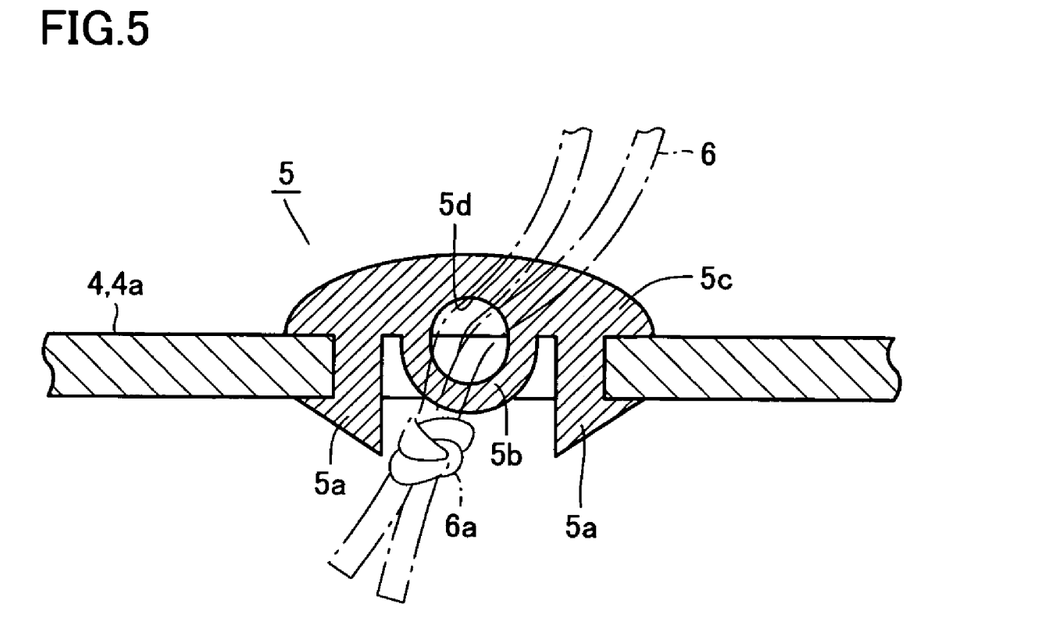
FIG. 5 is a cross section taken along the line V—V of FIG. 4 showing the embodiment.
Figure 6:
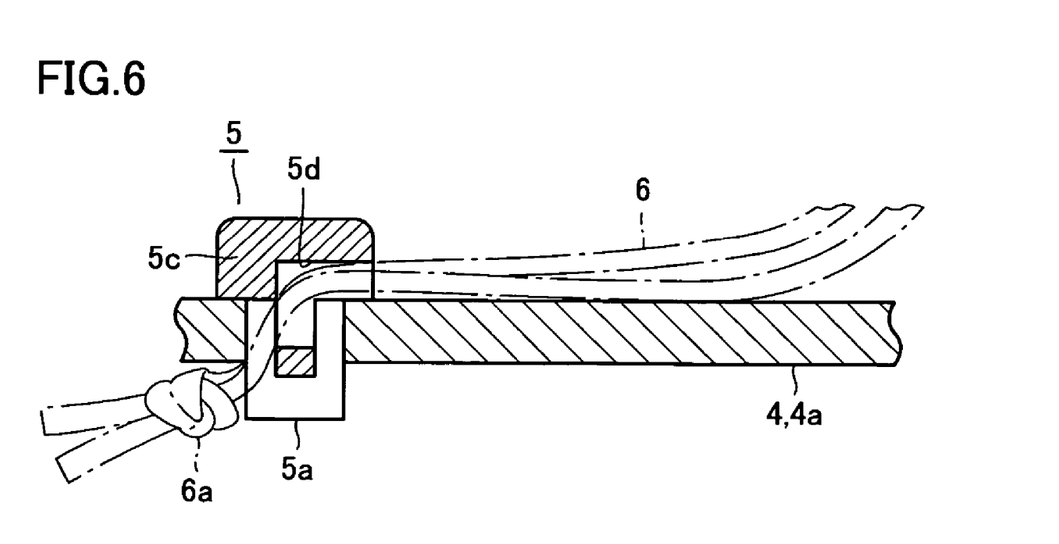
FIG. 6 is a cross section taken along the line VI—VI of FIG. 4 showing the embodiment.

As shown in FIGS. 2 and 3, the string holding member 5 includes a pair of engaging portions 5a, a sting inserting portion 5b, a cover portion 5c and a guide groove 5d. The pair of engaging portions 5a are engaged with opening 4c formed in lens cap 4. A string 6 is passed through string inserting portion 5b, and string 6 is retained, as string 6 is prevented from being pulled out, by a knot 6a. Cover portion 5c covers opening 4c when string holding member 5 is mounted on opening 4c. Guide groove 5d is formed on the back side of cover portion 5, and guides string 6 from the back side to the front side of front portion 4a of lens cap 4, when string holding portion 5 is mounted to opening 4c.

Next, how string 6 is held by string holding member 5 will be described. As shown in FIG. 2, a string having one end and the other end tied to each other to form a ring with a knot 6a is used as string 6.

The ring-shaped string 6 is extended in one direction, and in this state, string 6 is inserted to string inserting portion 5b, from the side (hereinafter referred to as loop side) opposite to the knot 6a. Thus, string 6 is passed through string inserting portion 5b as if two strings are inserted.

When string 6 is pulled from the loop side and the knot 6a reaches string inserting portion 5b, string 6 does no longer proceed, and string is not pulled out. In this manner, string 6 is retained by string holding member 5.

Next, the pair of engaging portions 5a of string holding member 5 are inserted to opening 4c of lens cap 4, so that the pair of engaging portions 5a are engaged with front portion 4a and string holding member 5 is mounted to opening 4c. At this time, by guide groove 5d formed at string holding member 5, string 6 is guided from the inside to the outside of front portion 4a of lens cap 4.

Figure 7:
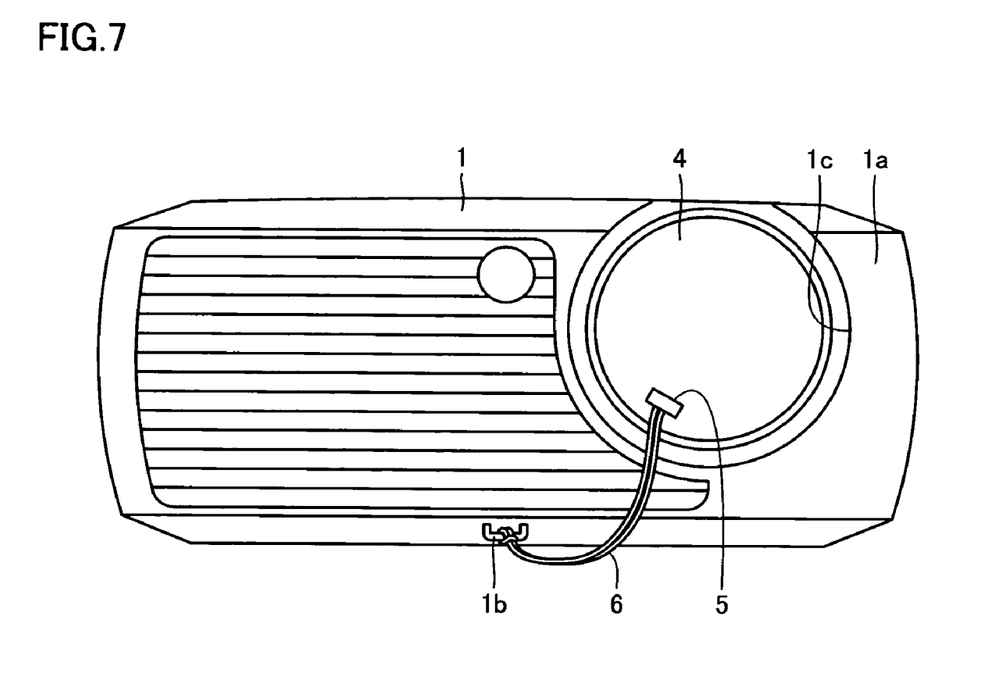
FIG. 7 is a front view of the projector with the lens cap mounted, in accordance with the embodiment.

Next, the loop side of string 6 is inserted to retainer ring 1b of front panel 1a, the loop is enlarged, lens cap 4 is threaded through the loop and pulled, so that loop side of string 6 is retained by retainer ring 1b, as shown in FIG. 7.

Finally, lens cap 4 is put on the focus ring, and thus the operation of attaching lens cap ends.

In projector 1 described above, string 6 connecting lens cap 4 and front panel 1a is retained by holding member 5 mounted to opening 4c formed in front portion 4a of the lens cap.

Therefore, different from the conventional projector in which lock 104c is formed on a side portion 104b of lens cap 104, string holding member 5 does not interfere with front panel 1a, and particularly with lens opening 1c through which the lens is exposed.

As a result, the positional limitation 4 (in the circumferential direction) for mounting lens cap 4 is eliminated, and lens cap 4 can easily be mounted on focus ring 3.

Projector 1 sometimes has such a structure that the lens and the focus ring are not protruded from front panel 1a, in view of lens protection and better design.

Figure 8:
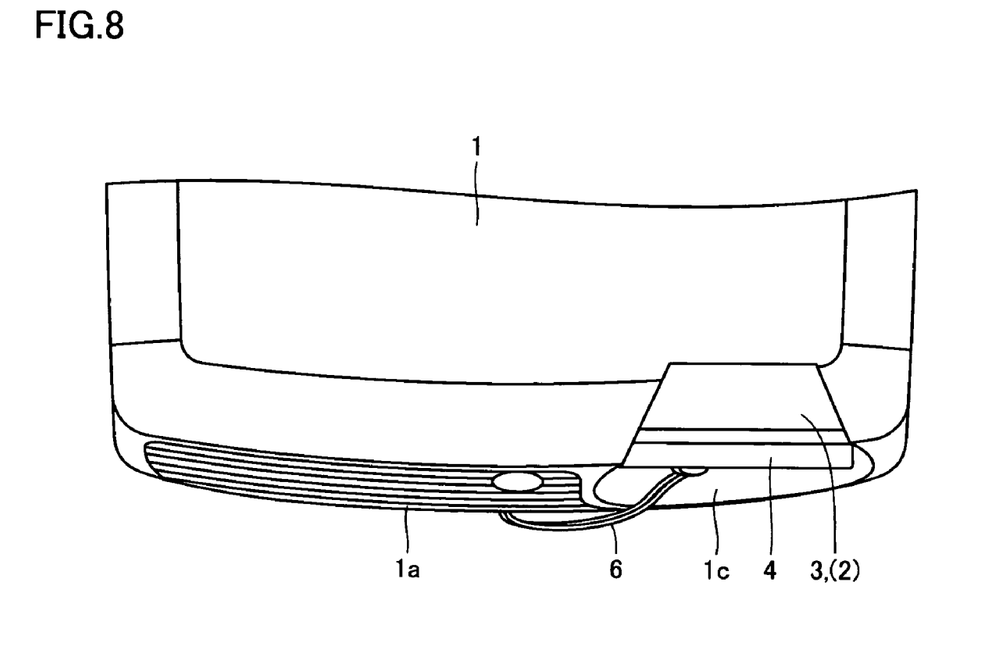
FIG. 8 is a top view of the projector with the lens cap mounted, in accordance with the embodiment.

In that case, as shown in FIG. 8, the front end portions of lens 2 and focus ring 3 are flat with the position of front panel 1a or recessed from the position of front panel 1a. Therefore, it follows that lens opening 1c of front panel 1a is positioned around focus ring 3, and the space between focus ring 3 and front panel 1a becomes relatively narrow.

Even in that case, string 6 is retained by string holding member 5 attached to opening 4c formed at the front portion 4a of the lens cap, and therefore, lens cap 4 does not interfere with front panel 1a and lens cap 4 can easily and reliably be put on focus ring 3.

Further, even when front panel 1a or the like is subjected to design change, lens cap 4 can be put on focus ring 3 without any design limitation. In addition, as string holding member 5 is attached to opening 4c provided at lens cap 4, degree of freedom in designing lens cap 4 itself is also increased.

Further, by the adoption of a structure in which a string holding member 5 is prepared and attached to opening 4c formed in lens cap 4, the following effects can be attained, as compared with an integrally molded structure. Specifically, in an integrally molded structure, molding is performed after the position for receiving the string is determined at a prescribed position of the lens cap. Here, the portion for receiving the string is relatively small, and positioning of the string takes time and labor, which hinders cost reduction.

In the present projector, string holding member 5 is molded separately from lens cap 4, and lens cap 4 is formed to have an opening 4c. When string holding member 5 is engaged with opening 4c, only a simple operation of connecting the string is required. Therefore, cost reduction is facilitated.

Further, opening 4c formed in lens cap 4 is covered by the cover portion 5c of string holding member 5, and therefore, entrance of dust and the like through opening 4c to the inside of lens cap 4 can be prevented.

When lens cap 4 is removed and placed on a table or the like, for example, while projector 1 is being used, and liquid should be spilled over lens cap 4, the liquid does not enter opening 4c, as it is covered by cover portion 5c.

The present invention is effectively used for a structure that facilitates attachment of a lens cap, for a projector having a lens cap.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A projector, comprising:
   a lens portion for projecting an image;
   a front panel having a lens opening through which said lens portion is exposed;
   a focus ring attached to said lens portion not to protrude from said front panel;
   a lens cap having a front portion covering said lens portion and a cylindrical side portion formed along an outer circumference of said front portion and covering said focus ring from circumferential direction;
   a prescribed opening formed in said front portion of said lens cap;
   a string holding member attached to said opening of said lens cap; and
   a string having one end and the other end connected to form a ring with a knot, for connecting said string holding member and said front panel;
   wherein said string holding member includes
      a cover portion covering said opening formed in said lens cap,
      a pair of engaging portions formed protruded in one direction from said cover portion and inserted through said opening to be engaged with said lens cap;
      a string inserting portion formed protruding in one direction from that portion of said cover portion which is sandwiched between said pair of engaging portions, through which said ring-shaped string extended in one direction is inserted and retained as said knot prevents said string from being pulled out, and
      a guide groove provided on one side of said cover portion and guiding said string from one side to the other side of said front portion of said lens cap when said string holding member is attached to said opening; and said front panel has a retainer ring for retaining a side of said string that is opposite to the side of the knot.

2. A projector, comprising:
   a projector body having a front panel;
   a lens portion arranged to be exposed at a prescribed position of said front panel;
   a lens cap comprising an opening in a front portion of the lens cap for protecting said lens portion;
   a string for connecting said lens cap and said projector body; and
   a string holding member inserted into said opening of said lens cap;
   wherein said lens cap has a cylindrical side portion formed along an outer circumference of said front portion; and
   wherein one end of said string is connected to said lens cap at said opening by said string holding member.

3. The projector according to claim 2, further comprising:
   a focus ring attached to said lens portion;
   wherein said focus ring is arranged not to protrude forward from said front panel.

4. The projector of claim 2, wherein the string passes through the opening of the lens cap.

5. A projector, comprising:
   a projector body having a front panel;
   a lens portion arranged to be exposed at a prescribed position of said front panel;
   a lens cap for protecting said lens portion, wherein said lens cap comprises a front portion and a cylindrical side portion formed along an outer circumference of said front portion;
   a string for connecting said lens cap and said projector body, wherein said string is connected to said lens cap at said front portion;
   a string holding member attached to said front portion of said lens cap for holding one end of said string; and
   an opening formed in said front portion to be engaged with said string holding member for attachment;
   wherein said string holding member has a cover portion covering said opening; and
   wherein said string is held by a portion of said cover portion on the side of said opening.

6. The projector according to claim 5, wherein said string holding member includes
   a pair of engaging portions formed protruded in one direction from said cover portion and inserted through said opening to be engaged with said lens cap,
   a string inserting portion formed protruding in one direction from that portion of said cover portion which is sandwiched between said pair of engaging portions, through which said ring-shaped string extended in one direction is inserted, and
   a guide groove provided on one side of said cover portion and guiding said string from one side to the other side of said front portion of said, lens cap when said string holding member is attached to said opening.

7. The projector according to claim 6, wherein
   said string has one end and the other end connected to form a ring with a knot;

said ring-shaped string extended in one direction is inserted from the side opposite to said knot through said string inserting portion and retained as said knot prevents said string from being pulled out from said string inserting portion, and said projector body includes a retainer ring for retaining the side of said string that is opposite to the side of the knot.

* * * * *